United States Patent [19]

Caugant et al.

[11] 4,234,796
[45] Nov. 18, 1980

[54] FILM CHANGER FOR X-RAY APPARATUS

[75] Inventors: Jean Caugant; Jacques Dale, both of Paris, France

[73] Assignee: Compagnie Generale de Radiologie, Paris, France

[21] Appl. No.: 50,583

[22] Filed: Jun. 21, 1979

[30] Foreign Application Priority Data

Jun. 23, 1978 [FR] France .................................. 78 18837

[51] Int. Cl.³ .............................................. G03B 41/16
[52] U.S. Cl. ..................................... 250/468; 250/470
[58] Field of Search ........................ 250/468, 470, 471

[56] References Cited

U.S. PATENT DOCUMENTS

| 3,553,453 | 1/1971 | Hogan | 250/468 |
| 4,019,061 | 4/1977 | Finkenzeller | 250/470 |

Primary Examiner—Craig E. Church
Attorney, Agent, or Firm—Edwin E. Greigg

[57] ABSTRACT

A film changer especially for X-ray diagnostic apparatus permitting exposure at rapid frame rates. The film changer includes a supply magazine holding a stack of sheet film, a transfer device for transferring a sheet of film into an exposure station including a fixed and a movable pressure plate covered on the adjacent faces by intensifying screens, and an ejection device for ejecting exposed films into a receiver magazine.

The displacements of the movable plate to and from the fixed one are controlled by means of two pairs of cams rotating on parallel shafts as the plates have to be pressed to each other during exposure and moved apart during ejection and loading. The transfer and ejection devices have permanently rotating rollers cooperating with pressure cylinders. The pressure cylinder associated with the ejection rollers is movable to and away from the latter by means of further cams synchronized with those acting on the movable pressure plate so that ejection occurs before loading.

The transfer device is fed by an extractor which is coupled to the movable pressure plate, so that only its movement away from the fixed plate feeds a single sheet of film to the transfer device.

19 Claims, 3 Drawing Figures

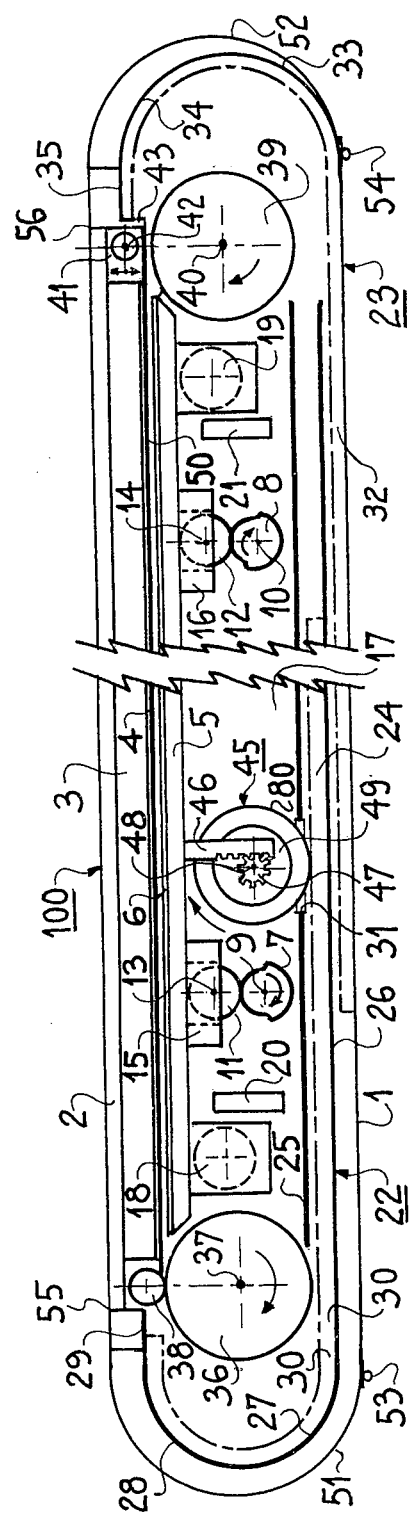
FIG_1

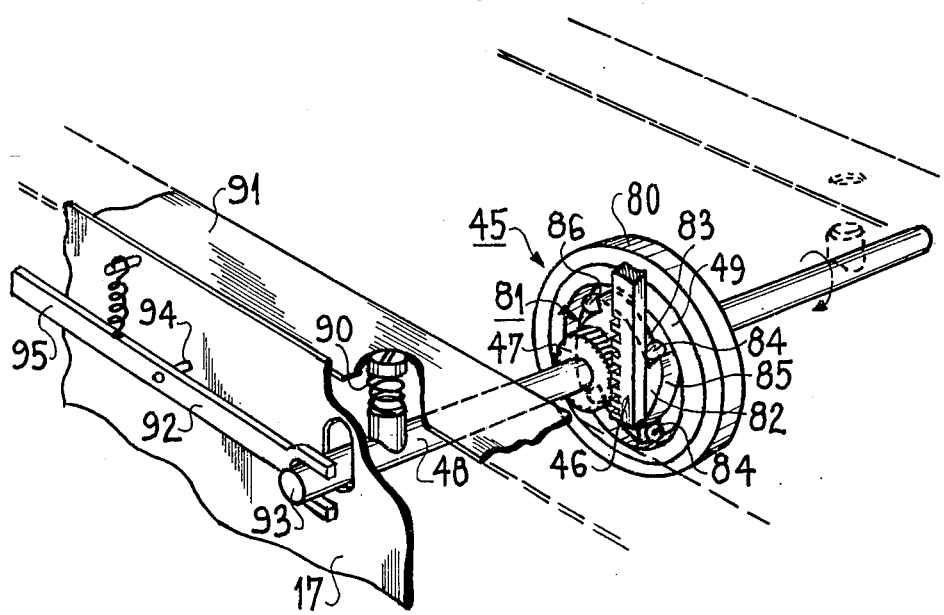
FIG_2
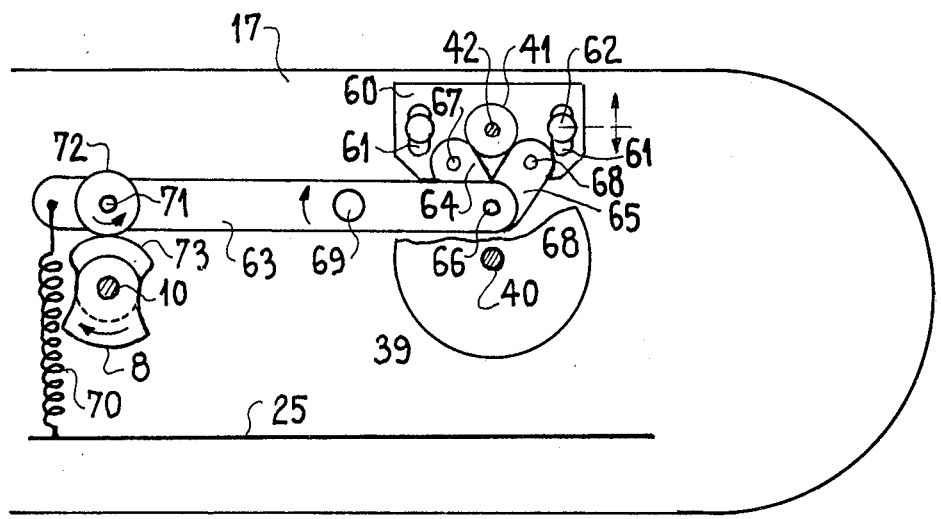
FIG_3

FILM CHANGER FOR X-RAY APPARATUS

FIELD OF THE INVENTION

The invention relates to the field of radiodiagnostic apparatus. More particularly, the invention relates to film changing apparatus for radiodiagnostic apparatus.

BACKGROUND OF THE INVENTION

Known film changers for radiodiagnostic apparatus include, for example, a supply magazine which is coupled to a mechanism which separates and extracts individual sheets of film from the film stack. The sheets are moved individually to an exposure region where they are placed one by one between two pressure plates which may be equipped with intensifying screens in which the film is exposed to X-radiation after which the film is transported to a receiver for exposed film.

The use of mechanical devices for separately extracting a film sheet from a stack as well as transferring the film to the exposure section and ejecting the exposed film therefrom, involves the use of a plurality of electric motors or, as described, for example, in French Pat. No. 1,571,792 delivered May 12, 1969, using a single motor for controlling the operation of a film sheet changer together with transmission devices (chain and sprockets, belt and pulley, or gearing) for driving a plurality of shafts in rotation and electrically controlled couplers (electromagnetic clutches) whose respective sequential operation has to be controlled by a programmer delivering electrical control signals. This implies relatively complex arrangements whose reliability and maintenance may create problems. The use of several motors or of couplers and transmissions with a single motor also increases the dead weight of the apparatus and makes them cumbersome and difficult to handle. Moreover, the required near-perfect synchronization between the different parts becomes difficult to maintain for relatively rapid rates of frame exposures.

Several known film changers, such as those described in U.S. Pat. Nos. 3,891,850 and 3,971,953 respectively issued June 24, 1975 and June 27, 1976, or in French Pat. Nos. 2,099,303 and 2,196,726 respectively delivered Feb. 14, 1972 and Mar. 4, 1974, make possible the use of film of different formats. A different supply magazine and different extraction and film transfer devices are then required for each format, which still further increases the size and complexity of the apparatus.

OBJECT AND SUMMARY OF THE INVENTION

It is a principal object of the present invention to provide a simple and inexpensive film sheet changer in which the foregoing disadvantages of the prior art are overcome. It is an associated object of the invention to provide an X-ray film changer in which the film extraction device is operated by means of the displacements of other film changer elements and thus does not require express synchronization i.e. control by means of sequentially generated electrical signals delivered by a programmer.

An associated object is also the overall simplification of the film changer and the film extraction and transfer and ejection devices. All these objects and others yet to emerge from a detailed description of the invention are attained by providing a film changer which has a film supply section, a film sheet extraction device, a device for transferring the extracted sheet to an exposure station with two pressure plates equipped with intensifying screens and one of which is mobile, and an ejection device for removing the exposed film to an exposed film receiver section. It is a particular feature of the present invention that the film sheet extraction device which slides off a single sheet of film from the stack for presenting the front edge thereof to the transfer device is coupled to the movable, lower one of the pressure plates, whereby it is driven by the motions of the movable pressure plate away from the fixed, upper one.

In a particular feature of the invention, the supply magazine and the receiver magazine each have a plane portion situated substantially below the exposure station and, adjacent thereto, a substantially semicylindrical portion and wherein the ends of the supply magazine and the receiver magazine remote from the plane portion terminate substantially in the respective vicinities of the transfer and ejection devices. In this manner, the edge of a new sheet of film is very close to the film transfer device and can be rapidly moved into the exposure region.

In one embodiment of the invention, the film changer includes at least one removable and interchangeable cartridge which has a light-tight outer casing that contains the supply and receiver magazines as well as the pressure plates and the film extraction, transfer and ejection devices. The film changer cartridge according to the invention is coupled with a fixed, stationary part thereof which incorporates the mechanism for driving the above devices and the pressure plate as well as control devices and measurement indicators for ensuring the correct functioning of the film changer within a radiographic apparatus to which the latter part may be secured.

In this embodiment, the removable cartridge does not itself contain any motor or other means for providing mechanical power, nor does it contain electrical or electronic circuits; it is thus capable of being removed easily and replaced by an identical or similar cartridge which may contain films having a format of a different size.

The invention will be better understood as well as further objects and advantages thereof will become more apparent from the ensuing detailed description of a preferred exemplary embodiment taken in conjunction with the accompanying drawings.

BRIEF DESCRIPTION OF THE DRAWING

FIG. 1 of the drawing is a side elevational and partially schematic illustration of a film changer according to the invention, with one sidewall removed.

FIG. 2 is a partial perspective view of the film sheet extraction device 45 of FIG. 1.

FIG. 3 is schematic partial side elevational view of the exposed film ejection device.

DESCRIPTION OF THE PREFERRED EMBODIMENT

Turning now to FIG. 1, there will be seen in side elevation a film changer having a casing 1 which is made light-tight and whose top portion 12 is removable and whose inwardly turned face supports a first, fixed pressure plate 3 whose lower face is equipped with a first intensifier screen 4. Optionally, a stationary anti-diffusing grid, not shown, may also be placed between the top 2 of the casing 1 and the first pressure plate 3. The lateral walls 51, 52 of the casing 1 are shown to be semicylindrical. This construction is preferred in that it prevents injury to the patient during examinations in which the film changer enters into contact with parts of the patient's body, but this external semicylindrical construction is not mandated by the invention.

Located below the first pressure plate 3 is a second, mobile pressure plate 5 whose top surface also carries a second intensifier screen 6. The second pressure plate 5 is capable of linear movement in a direction substantially normal to the plane of the first pressure plate 3 so as to permit pressure to be exerted against the sheet film 50 between the two intensifier screens 4, 6 at the time of exposure. The movement of the second, movable pressure plate 5 towards and away form the first one 3, is actuated, similarly to that described in British Patent Specification No. 1,071,940 published June 14, 1967, by two pairs of cams 7 and 8 which are in contact with two pairs of rollers 11 and 12 freely rotating on axes 13, 14 within bearings 15, 16, respectively, that are attached to the bottom face of the second pressure plate 5. The shafts 9 and 10 of the two cams 7 and 8 which are to be driven simultaneously in rotation, are respectively, supported in bearings, not shown, fixed to the lateral walls 17 of the casing 1. The vertical movement of the pressure plate 5 is guided by pairs of rollers 18, 19 and 20, 21 whose shafts are also rotatably supported by the second pressure plate 5 and which roll along stationary guides (not shown) fixed to the lateral walls 17 of the case 1. Moreover, the second, movable pressure plate 5 is urged away from the fixed one by a set of springs. The two pairs of cams 7, 8 as well as their respective shafts 9, 10 are preferably disposed symmetrically with respect to the transverse axis of the second pressure plate 5, to which the axes of the shafts 9, 10 are parallel.

As will be noticed from FIG. 1, one pair of cams 7 or 8 which include two circumferential portions of different radii, is angularly shifted somewhat with respect to the other side. Due to this disposition, when the cams are rotated simultaneously at the same speed, the contact of the pressure plates 3, 5 with the film progresses from one edge to the other and permits an orderly escape of the air in the zone between the two intensifier screens and results in an improved radiographic image.

The casing holds a supply magazine 22 for unexposed films in sheets and an exposed film receiver magazine 23. The supply magazine 22 has a plane portion 24 which is defined between an upper wall 25 and a lower wall 26 and lies substantially below the exposure region 100 (i.e. the movable pressure plate 5) of the apparatus and semicylindrical portion 27 shown on the left side of FIG. 1. This semicylindrical portion 27 is defined by the semicylindrical extension of the plane section 24 in a region 28. The upper wall 25 which, together with the lower wall 26, defines the plane portion 24 of the supply magazine 22, does not have to be continued into the semicylindrical part 27 due to the fact that the X-ray film tends to conform to the cylindrical configuration of the semicylindrical wall 28 which forms a continuation of the lower wall 26. The upper end of the curved wall 28 may be attached to the casing 1 at a location 29, but it may also form the inner face of the left end wall 51 of the casing 1, whose thickness is such that the upper edges of the film pack 30 are located substantially at the level of the zone defined between the pressure plates 3 and 5.

The upper wall 25 of supply magazine 22 has a longitudinal slot 31 through which penetrates a portion of a film extraction device 45 to be described in detail below and shown in FIG. 2, which enters into contact with the upper face of the top sheet in the unexposed film pack 30.

The exposed film receiver magazine 23 is substantially similar in construction to the supply magazine 22. It too has a plane portion 32 located substantially below the exposure section 100 of the apparatus and also partly below the plane portion 24 of the supply magazine. Adjoining thereto is a semicylindrical portion 33 constituted, as illustrated, by a semicylindrical wall 34 attached at the point 35 to the casing 1 or forming the inner face of the right end wall 52 thereof. The respective lateral walls of the supply magazine 22 and the receiver magazine 23 are formed by the aforementioned lateral walls 17 of the case 1.

Disposed between the semicylindrical portion 27 of the supply magazine 22 and the pressure plates 3 and 5 is a film transfer device which includes a first pair of drive rollers 36 secured to a first shaft 37 and cooperating with a freely rotating first pressure cylinder or rollers 38. When the film extraction device 45 is operated, the first drive rollers 36 engage the front edge of the top sheet of film and transport it to the exposure station 100 (i.e. between the pressure plates 3, 5). The first drive rollers 36 may be replaced by a single drive cylinder extending over the entire width of the film. The shafts of the first drive rollers 36 and pressure cylinder 38 are supported in fixed bearings secured to the sidewalls 17 of the casing 1.

Located between the other end of the exposure station and the entrance to the receiver magazine 23 is an exposed film ejection device which includes a second pair of drive rollers 39 secured to a second shaft 40 and cooperating with a second pressure cylinder 41 on another shaft 42. The location of the second shaft 40 supported by bearings (not shown) fixed to the sidewalls 17, is displaced somewhat toward the bottom of the casing 1 by comparison with the first shaft 37, i.e. the second shaft 40 is further away from the top wall 2 of the casing than the first one 37, so that the top tangent plane of the second drive rollers 39 is aligned with the upper face of the lower intensifying screen 6, when the movable pressure plate 5 is in its lowered position after exposure. Thus the front edge of an exposed film sheet 50 enters into contact with the second drive rollers 39 when the movable plate 5 is being lowered and when it is becoming disengaged from between the plates 3, 5. The shafts 37, 40 of both pairs of drive rollers 36, 39 being permanently rotated, the shaft 42 of the second pressure cylinder 41 has to be movable toward and away from the second drive rollers 39 of the ejection device so that the front edge of the film sheet is engaged therebetween only after its exposure has been completed. This may be obtained by means of a mechanism described hereinbelow and shown in FIG. 3.

FIG. 3 shows a possible embodiment of a mechanism for displacing the second pressure cylinder 41 mechanically coupled to the device for driving the second, movable plate 5 so as to synchronize the time sequence of their displacements.

In FIG. 3, the bearings (not shown) respectively supporting the two ends of the shaft 42 of the second cylinder 41 are each carried by a mounting plate 60 movably mounted on a sidewall 17 of the casing 1 by means of two elongated cut-outs 61 whose longitudinal axes are parallel to the direction of displacement of the movable plate 5. Each plate 60 is held against a sidewall 17 by means of two pins 62 engaged in these cut-outs 61 and having one end secured to the sidewall 17 and another end fitted with a radial enlargement or shoulder whose diameter is larger than the width of the cut-out 61, by which it is retained. The cut-outs 61 allow limited movements of the plate 60, parallel to their longitudinal axes.

Each plate 60 is coupled to one end of a lever 63 by means of two connecting rods 64, 65 having one end linked to a pin 66 secured to the lever and the other end linked to pins 67, 68 respectively fixed to two different points of the plate 60. The lever 63 is articulated in its middle on a pivot 69 secured to a sidewall 17 and its other end is coupled to one end of a drawspring 70 whose other end is fixed to the top wall 25 of the supply magazine 22, for urging it downwards. This end of the lever 63 also carries a pivot 71 freely rotatably supporting a roller 72. The circumference of this roller 72 is held in contact with that of a further cam 73 secured to the shaft 10 carrying the second pair of cams 8 which is driving the movable pressure plate 5. The shape and location of this further pair of cams 73 relatively to the second pair 8 is such that the lever 63 will pivot about pin 69 to pull the second pressure cylinder 41 against the second drive rollers 39 when the second pair of cams 8 have allowed the lowering of movable plate 5 and to move the second cylinder 41 away from ejection roller 39 well before moving plate 5 upwards, so that the unexposed film sheet propelled between the pressure plates 35, when they are apart, should not also be ejected into the receiver magazine 23.

A film stop 43 is located just behing the film ejector device to arrest the leading edge of a fresh sheet of film being placed in the receiving station 100. The mechanism 45 which extracts the top sheet of unexposed film from the supply magazine 22 and which is shown in more detail in FIG. 2, includes a rack 46 attached to the bottom of the movable plate 5. The rack 46 is engaged by a pinion 47 secured to a shaft 48 which is supported as shown in FIG. 2, so as to be capable of movement parallel to the direction of motion of the pressure plate 5. The shaft 48 of the pinion 47 supports freely rotatably a roller 49 with which it is coupled by a one-way, unidirectional or irreversible coupler 81, for example of the type described in U.S. Pat. No. 3,936,642 issued Feb. 3, 1976 and assigned to the assignee of the present application, which prevents its rotation in the direction opposite to the arrow. This unidirectional coupler 81, which can be made up from a ratchet and pawl or a strut-action pawl motion, is shown in FIG. 2 as including a hub 82 secured to the shaft 48 of the pinion 47 and provided with ramp-shaped cut-outs 83 on its periphery, in which balls 84 (or rollers) are located whose diameter is slightly smaller the maximum depth of the cut-outs 83. These ramps or tapers 83 terminate in radial walls at one end and rise gradually towards an outer face 85 which faces a cylindrical inner face 86 formed by a coaxial cavity within the roller 49. When the shaft 48 rotates in the direction of the arrow, the balls 84 tend to roll up the ramp 83 until they become jammed between it and the cylindrical inner face 86 of the roller 49 for driving it. When rotated in the opposite direction, the balls 84 will go to the deep end of the taper 83 and the roller 49 becomes uncoupled from the shaft. The periphery of the roller 49 is covered with a ring 80 of a material having a relatively high coefficient of friction relatively to the sheet of film, such as rubber (natural or synthetic). The shaft 48 of the pinion 47 is supported in bearings movably mounted on the lateral walls 17 of the casing 1, for displacements in directions parallel to those of the movable plate 5. Furthermore, a pair of compression springs 90, shown in FIG. 2, whose top end presses against side-sills 91 secured the side-walls 17 and whose lower end presses against shaft 48, causes the latter to be urged at all times in the direction of the film pack 30, causing rubber ring 80 of the roller 49 to make continuous contact with the top sheet of film in the stack.

In the preferred exemplary embodiment illustrated, the source of motive power for all the mechanical elements in the film changer lies outside of the film changer itself. In order to transfer motive power to these movable elements, the respective shafts 9, 10 of the cams 7, 8, and those 37, 40 of the rollers 36, 39 project through at least one of the side walls 17 of the casing 1 and their external ends are equipped with suitable coupling means for engaging them with registering drive shafts for transmitting a rotary motion. The casing 1 itself and all the elements contained therein represent a removable and interchangeable assembly, i.e., a cartridge which can be guidedly inserted into facing elements of a fixed portion secured to the overall X-ray apparatus so as to be coupled to the sources of motive power contained therein. The fixed portion (not shown) may include the control and indicating instruments (exposure meter, film sheet, counter etc.) necessary for the operation of the radiographic apparatus as well.

The sources of motive power as well as the control and indicating instruments which are part of the X-ray apparatus are considered to be known in the art and within the scope of competence of a person skilled in the art. The motion transmission may take place for example by the use of a single motor and a suitable system of gear, chain or belt-type transmission.

The loading of the film supply magazine and the unloading of the exposed film receiver may both be performed manually in a dark room. However, in order to avoid any handling of the film, the film changer according to the invention might also be attached to an automatic film loading and/or to an automatic film development machine, known per se. For this purpose, the semicylindrical end walls 51, 52 are rendered pivotable about hinges 53, 54, respectively, and are held in the closed position by known closure mechanisms, not shown, for example at points 55, and 56, respectively.

In a different embodiment, the loading and unloading of film may also take place by removal of at least a portion of one of the lateral walls 17. In such an embodiment the sheets of film would be introduced into the plane portion of the supply magazine and may then be pushed around the semicylindrical portion until they are in the vicinity of the rollers 36 and the cylinder 38 (like in aforementioned French Pat. No. 1,571,792).

The function and operation of the film changer according to the invention is as follows:

Prior to a series of exposures, a full cartridge is placed in the X-ray apparatus. When so placed, the motion transmitting elements of the cartridge are suitably aligned with and engaged with the shafts driven by the single electrical motor in the fixed part of the film changer. At the proper time, the operator actuates the motive source, thereby rotating the rollers 36, 39 and the cams 7, 8. The rotation of the cams 7, 8 causes the downward motion of the previously elevated pressure plate 5 and the downward motion of the attached rack 46. As shown in FIG. 3, before the end of the descent of the movable plate 5 or during the initial phase of its lowered position, the third cams 73 make the second pressure cylinder 41 of the ejection device, move away from its associated second roller pair 39. At the same time, the descending motion of the rack 46 turns the pinion 47 and the roller 49 in the sense of the arrow. This roller 49, which is in permanent contact with the top of the first sheet of film, displaces the latter toward the pinch line between the first rollers 36 and the first cylinder 38 which then take over its transport into the exposure station 100 until the front edge of the sheet of film makes contact with the film stop 43. Thereafter, the cams 7, 8 cause the reelevation of the pressure plate 5 which applies suitable pressure against the sheet of film 50 lying between the two intensifying screens 4 and 6. During the upward movement, the rack 46 turns the pinion 47 in the opposite direction but the aforementioned one-way coupler 81 prevents the rotation of the roller 49 in the direction opposite the arrow. After exposure of the sheet of film, the pressure roller 41 is moved downwardly by the action of the third cams 73 and the lever 63 of FIG. 2 and bends the front edge of the film out of the way of the stop 43 and presses it against the roller 39 which is rotated at all times. At the same time, the cams 7, 8 make the movable plate 5 to be lowered and the ejection rollers 39 and cylinder 41 pull the sheet of film from its exposure position 100 and transfer it under the stop 43 into the receiver magazine 33. As was the case in the supply magazine, the natural properties of the sheet of film are such as to cause it to conform to the cylindrical wall 34 without additional guidance. During the film ejection, the pressure plate 5 descends again for simultaneously allowing the transfer of a further sheet of film into the exposure station 100. The process is continued in this manner until the supply magazine 22 is empty.

In order to prevent the presence of exposed film from interfering with the motion of new film, the pair of rollers 39 are rotated somewhat faster than the rollers 36 and the lowering of the movable plate 5 is made slower (by suitably shaping the cams 7, 8) than that of pressure cylinder 41.

If necessary, means may be provided for arresting the advance (by friction, for example) of the sheet of film so as to ensure its correct placement in contact with the stop 43.

The continuous operation of the film changer, i.e. the extraction and advance of sheets of film from the supply magazine 22 to the exposure station 100 and thereform to the receiver magazine 23, may be continued until the supply is exhausted. However, it may be desired to prevent the further transport of film, for example by the provision of two levers 92, shown in FIG. 2, whose forked ends are coupled respectively to the outwardly projecting ends 93 of the shaft 48 and which are articulated on outwardly projecting pivots 94 fixed to the sidewalls 17 of the casing 1, and may be actuated, for example, by an electromagnet located in the fixed part of the film changer and arranged to exert a downward pull on the free ends 95 of the levers 92. When the levers 92 are actuated, the shaft of the pinion 47 is moved in the direction of the movable pressure plate 5 (upwards) to place the roller 49 out of contact with the stack of film, thereby preventing any further extraction of film from supply magazine 22.

The removable top portion 2 of the case 1 permits access to the interior of the changer for the cleaning or the changing of the intensifier screens 4, 6 and other surfaces.

In actual operation, the film changer according to the invention has been found to permit an exposure rate of 4 frames per second. Furthermore, by placing films of different dimensions in different cartridges, the film format may be easily changed without encumbering each and every film changer.

The film changer according to the invention is handled easily, its weight is no greater than 6 kg and its dimensions may be, for example, 48 by 70 cm.

The use of the film changer cartridge according to the invention makes it easy to change over from radioscopy to radiography by simply removing it for permitting the X-rays to reach a fluorescent or an input screen of an image intersifier, which is located below the part of the apparatus where the film cartridge would normally be located.

The foregoing description relates to a preferred exemplary embodiment of the invention, it being understood that other embodiments and variants thereof are possible within the spirit and scope of the invention.

What is claimed and desired to be secured by letters patent of the United States is:

1. A film changer for an X-ray apparatus including within a light-tight casing a supply magazine for holding a stack of unexposed film in sheets, means for extracting a single sheet from said stack, an exposure station having two parallel pressure plates respectively covered on their adjacent faces by intensifying screens, one being fixed and the other reciprocably movable toward and away from said fixed one, means for transferring the extracted sheet between said pressure plates when apart, means for ejecting the film sheets after their exposure from said exposure station, and a receiver magazine for holding the exposed film sheets, wherein the extracting means comprise means for coupling it to the movable pressure plate so that its sole displacement away from said fixed plate actuate the extraction of a film sheet and its presentation to the transferring means.

2. A film changer as claimed in claim 1, wherein said coupling means comprise a rack secured to and projecting normally from said movable plate to the side thereof which is opposite the one covered by the intensifying screen and a pinion engaging with said rack and secured to a shaft perpendicular to the respective displacement of the movable plate and the film.

3. A film changer as claim in claim 2, wherein said pinion is coupled by means of a unidirectional coupler to an extraction roller rotatable about a spindle parallel to said pinion shaft, said spindle being mounted movably toward and away from said unexposed film stack, so that the circumference of said friction roller may act by friction on the top sheet thereof.

4. A film changer as claimed in claim 3, wherein the respective ends of said spindle are acted upon by resilient spring means for applying a force urging said roller against said stack whatever its thickness.

5. A film changer as claimed in claim 2, wherein the shaft carrying said pinion rotatably supports an extraction roller to which it is coupled by means of a unidirectional coupler and has its ends mounted in bearings movable in directions parallel to those of the displacements of the movable pressure plate, the respective ends of the shaft engaging with springs for applying a force urging said extraction roller against said film stack which includes a portion lying beneath said movable plate.

6. A film changer as claimed in any of claims 4 or 5, wherein the spindle has ends projecting outwardly from the casing, which ends respectively engage with means for holding the extraction roller away from said film stack.

7. A film changer as claim in claim 5, wherein the movable shaft has ends projecting outwardly from the casing each of which respectively engage with one end of a lever pivotable at its center about pins secured to the casing sidewalls, the other ends of said lever being controllable by external mechanical means for disengaging said extraction roller from said film stack.

8. A film changer as claimed in claim 1, wherein said supply and said receiver magazines each have a plane portion located below said exposure station, said plane portion being jointed to a semicylindrical portion whose end remote from said plane portion is respectively located adjacent to said transfer and said ejector devices.

9. A film changer as claimed in claim 8, wherein semicylindrical portions of said supply and said receiver magazine each include a curved bottom wall secured to the opposite end walls of the casing.

10. A film changer as claimed in claim 9, wherein the opposite end walls of the casing are attached to said changer by hinge means permitting by pivoting access to the interior of said supply and said receiver magazines, respectively.

11. A film changer as claimed in claim 8, wherein said semicylindrical portions of said supply magazine and said receiver magazine are enclosed by lateral walls one of which may be at least in part removable to provide access to the interior of said film changer for the purpose of loading and unloading said magazines.

12. A film changer as claimed in claim 1, comprising two pairs of identical cams for actuating the motion of said movable pressure plate, said pairs of cams being mounted on parallel shafts with a relative angular shift providing canting of said movable pressure plate and progressive closure thereof during the rotations of said cams.

13. A film changer as claimed in claim 12, wherein said transfer device includes first drive rollers cooperating with a first pressure cylinder and wherein said ejector device includes second drive rollers cooperating with a second pressure cylinder, said second pressure cylinder being displaceable to and from said second drive rollers.

14. A film changer as claimed in claim 13, wherein said second movable pressure cylinder is mounted in bearings displaceable in a radial direction relatively to the second rollers, said bearings being coupled to one end of two levers pivotable about their centers, whose other ends are acted upon by a further cams pair secured to one of the parallel shafts of the cam pairs for displacing the movable plate.

15. A film changer as claimed in claim 13, including means for rotating said second drive rollers of said ejector device at a somewhat higher speed than said first rollers of said transfer device.

16. A film changer as claimed in claim 1, having a removable light-tight casing forming a cartridge in which are contained said supply magazine, said pressure plates and said extractor, transfer and ejector devices, said film changer further comprising means for engaging drive means contained in a fixed part thereof to be associated with a radiographic apparatus and being capable of attachment thereto and release therefrom.

17. A film changer as claimed in claim 16, wherein different cartridges may contain a different size of film.

18. A film changer as claimed 16, wherein the cartridge including means for displacing said movable pressure plate and said transfer and ejector device rollers have shafts ends projecting from one sidewall thereof and wherein the fixed part of the changer includes a single motor and transmission means for driving a plurality of shafts having coupling means for engaging with the shaft ends projecting from the casing.

19. A film changer as claimed in claim 1, including transmission means for displacing said movable pressure plate and said transfer and said ejector device by means of a single motor driving a plurality of shafts at different velocities.

* * * * *